United States Patent [19]

Clabburn et al.

[11] 4,237,609
[45] Dec. 9, 1980

[54] HEAT-RECOVERABLE CONNECTOR

[75] Inventors: Robin J. T. Clabburn, Atherton, Calif.; Richard J. Penneck, Lechlade, England

[73] Assignee: Raychem Limited, London, England

[21] Appl. No.: 870,183

[22] Filed: Jan. 17, 1978

[30] Foreign Application Priority Data

Jan. 24, 1977 [GB] United Kingdom ............... 2833/77

[51] Int. Cl.³ .................... H01R 43/00; H02G 15/08
[52] U.S. Cl. ................................... 29/859; 29/863; 29/882; 156/85; 156/86; 174/35 C; 174/84 R; 174/DIG. 8; 228/245; 228/904; 339/275 R; 339/DIG. 1; 428/36; 428/161; 428/163; 428/913
[58] Field of Search .................. 29/628; 403/28, 272, 403/273; 156/85, 86; 228/904, 245, 246, 56, 128, 135, 132; 339/275 R, 275 B, DIG. 1; 174/35 C, 84 R, DIG. 8; 428/36, 161, 163, 913

[56] References Cited

U.S. PATENT DOCUMENTS

| | | | |
|---|---|---|---|
| 2,258,836 | 10/1941 | Willner | 250/27.5 |
| 2,972,657 | 2/1961 | Stemke | 339/275 |
| 3,234,630 | 2/1966 | Kenyon | 29/155.5 |
| 3,243,211 | 3/1966 | Wetmore | 29/630 F |
| 3,247,315 | 4/1966 | Miller | 403/193 |
| 3,273,226 | 9/1966 | Brous | 29/155.5 |
| 3,316,343 | 4/1967 | Sherlock | 174/84 |
| 3,525,799 | 8/1970 | Ellis | 174/84 |
| 3,541,495 | 11/1970 | Ellis | 339/177 |
| 3,616,532 | 2/1971 | Beck | 29/625 |
| 3,753,700 | 8/1973 | Harrison | 75/170 |
| 3,913,444 | 10/1975 | Otte | 174/DIG. 8 |
| 4,016,356 | 4/1977 | McLoughlin | 174/35 R |

FOREIGN PATENT DOCUMENTS

| | | |
|---|---|---|
| 493677 | 10/1938 | United Kingdom . |
| 1062870 | 3/1967 | United Kingdom . |
| 1098304 | 1/1968 | United Kingdom . |
| 1327441 | 8/1973 | United Kingdom . |
| 1327442 | 8/1973 | United Kingdom . |
| 1403175 | 8/1975 | United Kingdom . |
| 1428134 | 3/1976 | United Kingdom . |
| 1439848 | 6/1976 | United Kingdom . |

*Primary Examiner*—Francis S. Husar
*Assistant Examiner*—Gene P. Crosby
*Attorney, Agent, or Firm*—Lyon & Lyon

[57] ABSTRACT

A heat-recoverable article comprises a memory metal member to which has been imparted both thermally-recoverable and resiliently-recoverable strain. The resilient strain is retained by means of a disburdenable keeper, preferably one made from fusible or chemically degradable material, which can be removed, for example, by heating or chemical treatment, to allow resilient recovery. The article is preferably so constructed that it can be heated to obtain both thermal and resilient recovery simultaneously. One preferred form of article is a radially expanded longitudinally split tube, the keeper being positioned in the split. Such an article can be used as a connector to secure an earth lead to the sheath of a mineral-insulated cable.

15 Claims, 12 Drawing Figures

HEAT-RECOVERABLE CONNECTOR

This invention relates to heat-recoverable articles, especially connectors, made from memory metals.

As is known, certain alloys, commonly called "memory metals", can be used to make heat-recoverable articles, that is to say articles which have been deformed from an original configuration and which are capable of recovering towards that original configuration on heating. Amongst such memory metals, there may be mentioned, for example, various alloys of titanium and nickel which are described, for example in U.S. Pat. Nos. 3,174,851, 3,351,463, 3,753,700, 3,759,552, British Pat. Nos. 1,327,441 and 1,327,442 and NASA Publication SP 110, "55-Nitinol—The Alloy with a Memory etc." (U.S. Government Printing Office, Washington D.C. 1972). The property of heat-recoverability has not, however, been solely confined to such titanium-nickel alloys. Thus, for example, various beta-brass alloys have been demonstrated to exhibit this property in e.g. N. Nakanishi et al, *Scripta Metallurigca* 5, 433–440 (Pergamon Press 1971) and such materials may be doped to lower their transition temperatures to cryogenic regimes by known techniques. Similarly, 304 stainless steels have been shown to enjoy such characteristics, E. Enami et al, id at pp. 663–68.

In general these metals have a transition temperature within the range of from $-196°$ C. to $+135°$ C., especially from $-196°$ C. to $-70°$ C. (this being the lowest temperature they are liable to encounter during everyday use), and thus may be brought into their martensitic state by immersion in liquid nitrogen. However, more recently, it has been found possible to "precondition" memory metals so as transiently to raise their transition temperature. This enables the articles made from such alloys to be kept at room temperature prior to use, when they can be recovered by heating. Such preconditioning methods which eliminate the need for liquid nitrogen during storage and transportation, are described, for example, in German Offenlegungsschriften No. 2 603 878 and 2 603 911.

Such memory metals have been used to make mechanical and, especially, electrical connectors. Reference is made, for example, to British Pat. Nos. 1,327,441, 1,395,601, 1,420,682, 1,439,848 and U.S. Pat. Application Ser. No. 776,777 filed on Mar. 11, 1977. The devices described in these patent specifications have proved very effective in making mechanically strong connections with excellent electrical characteristics. However, the degree of dimensional recovery obtainable from the martensite to austenite transformation is quite small, especially for certain memory metals, e.g. β-brass alloys, which are desirable because they are relatively inexpensive and have good electrical properties. This small degree of dimensional recovery can create problems in applications where tolerances are not high or, for example, where a substrate to which the connection is to be made, such as a stranded cable, must be mechanically crushed to a small extent before a firm connection can be made.

The present invention is based on our observation that many of these alloys are also somewhat resilient and that it is possible to utilise their resilient recovery from a deformed state together with their thermal recovery and thus obtain a greatly improved degree of dimensional change.

The present invention provides a heat-recoverable article which comprises a heat-recoverable memory metal member held in an elastically strained state by a keeper made from a material which weakens or changes shape upon heating or chemical treatment so as to allow both thermal and resilient recovery.

The present invention also provides a method of making a heat-recoverable article, which comprises applying a stress to a memory metal member in its heat-recoverable state so as to impart a resiliently recoverable elastic strain and maintaining such strain by a keeper made from a meteral which weakens or changes shape upon heating or chemical treatment.

The present invention further provides a method of making a connection wherein a connector comprising a heat-recoverable memory metal article is held in a resiliently-recoverable elastically strained state by a disburdenable keeper and wherein the article is heated and disburdened of the keeper to effect connection.

By a "disburdenable keeper" there is herein meant one which can be removed or changed immediately before or at the onset of recovery so as to free the memory metal article from the deforming stress without the need to reduce the temperature of the memory metal article/keeper assembly to below the transformation temperature so as to bring the memory metal into the martensitic state. The keeper is preferably positioned between and separates two parts of the memory metal member so as to retain the resilient strain. The parts may be two edges of the member or may, for example, be two grooves or protruberances specifically provided for this purpose.

For example, when making a connection by the method of the present invention, the heat-recoverable article may be held in its resiliently recoverable state by a keeper which is simply removed to allow resilient recovery, thermal recovery being effected by heating during or after this operation.

However, in preferred embodiments of the present invention the disburdenable keeper is made from a material which on heating or chemical treatment changes shape or weakens so that it can no longer prevent recovery.

In general it is advantageous to use heat because then no separate step is necessary to effect thermal recovery. Thus for example, the keeper may be made from a fusible, heat-softenable or pyrolysable material. Especially suitable fusible and heat-softenable materials are thermoplastic polymers, e.g. such as homopolymers and copolymers, derived, for example, from olefin monomers, e.g. ethylene, propylene, butene and styrene, unsaturated esters, e.g. vinyl acetate, ethyl acrylate and methyl methacrylate and other unsaturated monomers such as acrylonitrile. Other suitable polymeric materials are Delryn, nylons and polysulphones. Certain low-melting metal alloys, e.g. lead-tin alloys, may also be used.

Amongst suitable pyrolysable materials there may be mentioned certain thermosetting polymers such as bakelite and urea-formaldehyde resins.

Of those materials which change shape on heating there may especially be mentioned heat-recoverable polymeric materials such as those described in U.S. Pat. Nos. 2,027,962 and 3,086,242. Heat-recoverable metals of the type described above may also be employed in certain applications.

In some cases the use of chemically degradable keepers may be appropriate. For example, a volatile organic solvent such as acetone may be applied to the keeper to cause it to weaken or change shape by, for example, dissolution or leaching out of a dissolvable component of the keeper material. In other applications the keeper may advantageously be made from a material, such as a polycarbonate, which undergoes stress cracking when treated with a solvent.

The keeper may be placed in position during or after the application of thermally recoverable strain to the article. For example, with certain alloys, it may be convenient to impart both thermal and elastic strain simultaneously to the article whilst the alloy is in its martensitic state. For example, a tubular coupling made from a nickel-titanium alloy may be given both types of strain by using a mandrel to expand it radially whilst it is immersed in liquid nitrogen. The mandrel, especially a hollow mandrel, may itself act as a keeper which is ultimately removed at the time of making the connection or, preferably, a keeper of the type described above is placed in position and the mandrel is removed.

However, especially with preconditioned alloys, the resilient strain may be imparted when the alloy is already in its heat-recoverable form. For example a split ring made from a preconditioned brass alloy may be opened resiliently and a keeper installed in place to prevent spring back.

In most applications of the present invention to connectors, it will be preferred that the keeper does not lie in the path of recovery, so that it does not interfere with the connection. Another reason why this is preferred is to avoid the loss of effective dimensional change relative to the substrate because of the thickness of a keeper trapped between the heat-recoverable article and the substrate.

However, in certain instances, it may be advantageous to use the keeper in making the connection. For example, a keeper made from solder may enhance the electrical and mechanical properties of the connection, and a keeper made from a thermoplastic polymer may be used to obtain a seal or to provide electrical insulation.

The heat-recoverable memory metal article advantageously exhibits a discontinuity in its cross-section in the plane of recovery. For example, especially useful articles are hollow, such as tubular couplings and rings, and are positioned about the substrates to which the connections are to be made. These articles are, therefore, preferably split so as to exhibit a discontinuity in their radial plane. Typical articles are, for example, C-rings and longitudinally slit tubes.

The provision of such a discontinuity has three advantages. First of all, the degree of dimensional change obtainable on thermal recovery is greater than for an otherwise similar article of continuous cross-section, because a bending deformation including both tensile and compressive components can be applied. Secondly, it is much simpler to impart a resilient strain to an article of discontinuous cross-section. Thirdly, the keeper may be placed in the discontinuity.

Thus, for example, in one preferred embodiment of the present invention there is provided a hollow heat-recoverable memory metal article having a discontinuity in its cross-section in the plane of recovery and held in an elastically strained state by a disburdenable keeper positioned within the discontinuity.

One simple manner in which such an article can be made, is for example as follows. A split tubular article is expanded on a mandrel and a block or wedge of heat-softenable material is interposed in the split. When the mandrel is removed, the resilient spring back which would normally occur is constrained by the keeper. The mandrel expansion may, for example in the case of nickel-titanium alloys, be used simultaneously to impart thermally-recoverable strain, or may, for example with preconditioned brass alloys, be used only to impart resilient strain. Such an article can be stored at a temperature below the transformation temperature of the alloy in its stressed state (in this respect reference is made to U.S. Pat. Application Ser. No. 870,195 filed Jan. 17, 1978.

When the keeper is positioned within a discontinuity in the memory metal member, the keeper, the memory metal member or both are preferably profiled so that they co-operate to retain the keeper within the discontinuity.

In one simple form the opposing edges of the memory metal member in the vicinity of the discontinuity may be machined so that they lie in a truly parallel relationship in the expanded configuration. In this way there is no danger that the keeper will be squeezed out by a wedge-like action.

However, in preferred embodiments, the keeper, the memory metal member or both are profiled so as positively to retain the keeper in position.

For example, the edges of the memory metal member may be machined with concave grooves and the keeper may be a rod or a tube. Alternatively, the keeper may be provided with concave grooves and the edges may be machined to the appropriate convex curvature. In another arrangement of this type, the grooves may be U-shaped or V-shaped and the edges of the memory metal member or the keeper are shaped so as to fit within them.

In one especially preferred embodiment the edges of the memory metal member are machined to have sloping surfaces and the keeper is dovetailed in cross-section, the sloping sides of the dovetail abutting the sloping surfaces of the edges. At the narrower end of the dovetail flanges are provided which fit around the edges of the memory metal member of either the inside or outside surface thereof.

In these and other embodiments it is not essential for the whole keeper to be disburdenable, it may be sufficient in many cases for only a portion thereof to be removable or changeable to allow recovery.

In other applications, especially where a connector is to be used to provide or maintain a seal, the heat-recoverable article will advantageously have a continuous cross-section. In such cases, the keeper will preferably be positioned externally (of a heat-shrinkable member) or internally (of a heat-expansible member) and may be shaped to co-operate with grooves or projections on the surface of the heat-recoverable article so as to hold the latter in a deformed state.

In use, the heat-recoverable connector is placed about the substrate(s) to which the connection is to be made and heat is applied to soften the keeper and raise the alloy above the transformation temperature, whereupon resilient and thermal recovery are simultaneously obtained. (Of course, with a low-melting or a chemically disposable or a displaceable keeper it is possible to recover the resilient strain at a temperature below the transformation temperature and then subsequently to recover the thermal memory strain by heating to above that temperature).

One especially preferred application for such a connector is in the formation of terminations and splices in mineral insulated electric cables. Such cables consist of one or more conductors surrounded by a sheath, usually of copper or aluminum, and having a powdered mineral insulation material, e.g. magnesium oxide, and the terminations and splices are usually covered by a sleeve of heat-recoverable material to exclude moisture from the insulation material, cf. British Pat. No. 1,098,304. It is desirable, and is increasingly necessary in order to conform with official regulations, to provide an earth connection to the sheath of the cable and it has been proposed in British Pat. No. 1,428,134 to provide a device for both sealing and effecting an earth connection for a cut back end of a mineral insulated cable in which device the earth connector is urged into contact with the copper sheath of the cable by means of the heat-recoverable plastics sleeve. However, the connection obtained is mechanically weak.

In accordance with the present invention, a mechanically strong earth connection can be made by positioning the hollow heat-recoverable memory metal article inside a heat-recoverable polymeric sleeve, which is preferably provided with a fusible insert or lining. Such a device can in one heating operation provide both the earth connection and the necessary seal for the mineral insulated cable. The temperature at which the keeper softens is preferably lower than the recovery temperature of the recoverable plastics sleeve and the fusion temperature of the fusible lining.

However, the heat-recoverable articles and the method of the present invention will find use in many other applications and it will be appreciated that, although the invention has been especially described with reference to hollow connectors, it is applicable to many forms of heat-recoverable articles, including, for example, heat-recoverable actuating elements forming part of composite devices.

Thus, the essential concept of the present invention is to utilise a disburdenable keeper to obtain both resilient and thermal recovery, and the invention is, therefore, especially suited to alloys in which an appreciable amount of resilient strain can be obtained. Typically this strain will be greater than 1%, preferably greater than 2% and the thermally recoverable strain will typically be from 2 to 10%.

Obviously, the invention will be especially suitable for those alloys which exhibit a relatively low degree of thermally recoverable strain but which exhibit desirable properties for other purposes, e.g. good electrical conductivity. Thus, for example, most brass alloys exhibit a maximum thermally recoverable strain of about 4% (as compared with, for example, 8% for certain nickel-titanium alloys). However, it is possible, in accordance with the present invention to utilise a further resilient strain of 4%, giving a total recoverable strain of 8%. With nickel-titanium alloys a resilient strain of up to 2% can be obtained.

Whilst the present invention is generally advantageously applied to any alloy which exhibits both resilient strain and thermally recoverable strain, preferably at least 1% of each, it is especially useful for alloys exhibiting at least 3% of at least one type of strain and in particular for alloys in which the total strain obtainable exceeds 6%. Within the latter category, there may be mentioned, for example, nickel-titanium alloys (typical strains 2% resilient, 8% thermal), β-brass alloys (typical strains 4% resilient, 4% thermal) and stainless steels (typicaly strains 6% resilient, 2% thermal) of the type described in the aforementioned references.

Various embodiments of the present invention will now be described in more detail, by way of example only, with reference to the accompanying drawings, in which.

Figure 1:
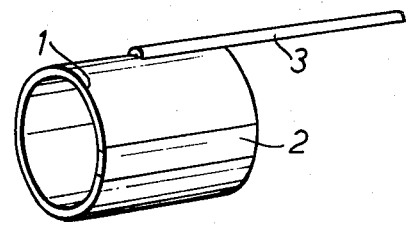
FIG. 1 shows a perspective view of an embodiment of a connector according to the invention in its heat-recoverable state.

Referring first of all to FIG. 1, a connector in accordance with the present invention comprises a split cylindrical hollow tube 1, formed from a preconditioned β-brass alloy, which is held in a radially expanded state by a body comprising a wedge of fusible material 2 interposed in the break in its circumference. The fusible material may for example be polystyrene. An earth lead 3 is connected to the split tube 1 by an suitable means, for example soldering. It can be seen that, because no fusible material 2 is positioned inside the split tube 1, the whole of the recovery of the split tube is available for making a firm mechanical connection with an electrical conductor passing therethrough.

Figure 2:
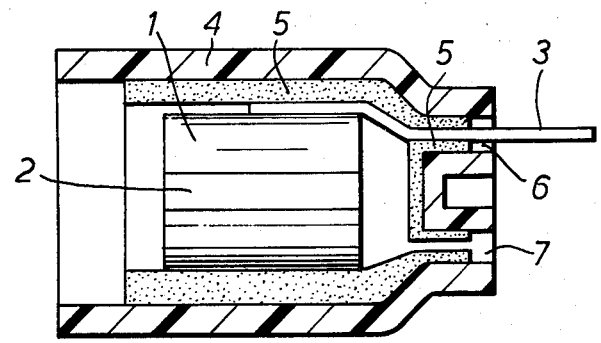
FIG. 2 shows a side elevation partly in section of the connector of FIG. 1 positioned within a heat-recoverable sleeve provided with a fusible insert.

Referring now to FIG. 2, there is shown a heat-recoverable sleeve 4 having positioned therein a fusible insert 5, the sleeve and the insert being provided with passages 6 and 7 for receiving conductors from the termination. For convenience only two of these are shown though it is to be understood that in practice there may be as many as five. Positioned within the fusible insert 5 is the split tube 1, held in a radially expanded state by the fusible wedge 2, and having its earth lead 3 passing out of the sleeve via the passage 6.

Figure 3:
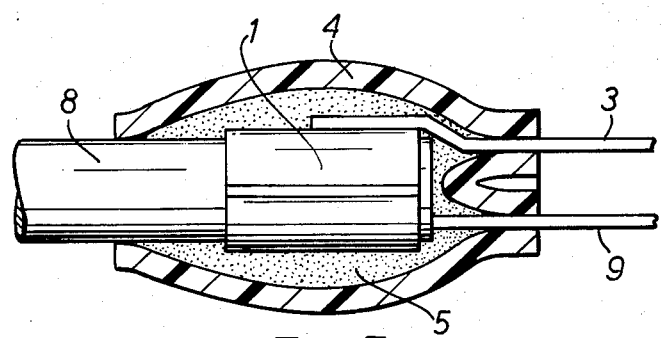
FIG. 3 shows a side elevation partly in section of the sleeve and the connector recovered about a termination of a mineral insulated cable.

FIG. 3 shows the assembly of FIG. 2 recovered about a termination of a mineral insulated cable 8. The cable has a conductor 9 which passes out of the termination via the passage 7. It can be seen that the split tube 1 has recovered into tight gripping engagement with the copper sheath of the mineral insulated cable and that the fusible insert 5 has flowed so as completely to encase the termination forming a moisture proof seal. The use of the assembly of FIG. 2 to provide an earth connection and a moisture proof seal for a mineral insulated cable termination is achieved in a very simple fashion. The assembly is simply positioned over the termination, making sure that the conductor or conductors of the mineral insulated cable pass through their respective passageways in the assembly, and the assembly is then heating, for example by hot air or other suitable means whereupon the wedge of fusible material is softened and fuses and then the split tube 1 and the sleeve 4 contract radially and the fusible insert 5 melts so that the desired sealed termination is effected.

Figure 4:
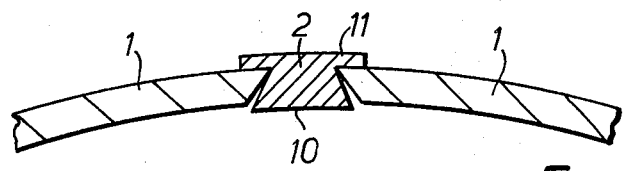
FIG. 4 shows, in cross-section, the arrangement, prior to recovery, of the keeper 2 and the edges of the tube 1 of the connector of FIGS. 1 to 3.

FIG. 4 shows how the keeper 2 and the opposing edges of the split tube 1 may be shaped to retain the keeper in position prior to recovery. In this preferred embodiment the keeper 2 has a dovetailed portion 10 adapted to co-operate with the machined edges and a flanged portion 11 which lies above these edges on the outer surface of the tube. Only the dovetailed portion 10 need be fusible.

Figure 5:
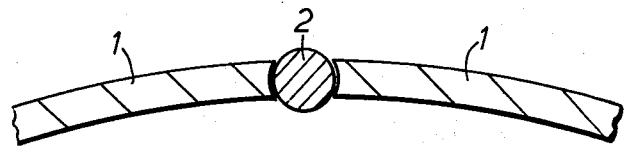
FIG. 5 shows, in cross-section, a second form of suitable arrangement.
Figure 6:
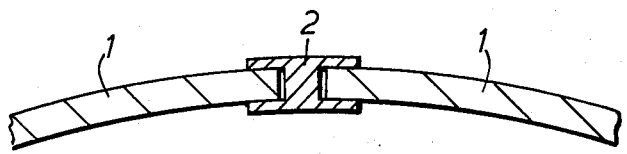
FIG. 6 shows, in cross-section, a third form of suitable arrangement.
Figure 7:
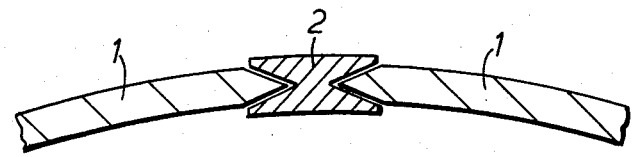
FIG. 7 shows, in cross-section, a fourth form of suitable arrangement.

FIGS. 5 to 7 show other suitable keeper/edge profiles.

Figure 8:
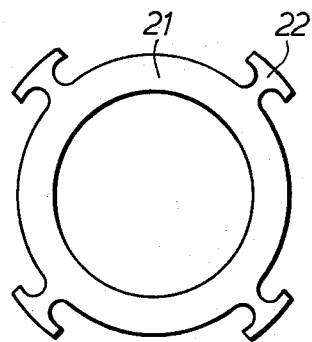
FIG. 8 illustrates a memory metal tubular coupling for use in the present invention.
Figure 9:
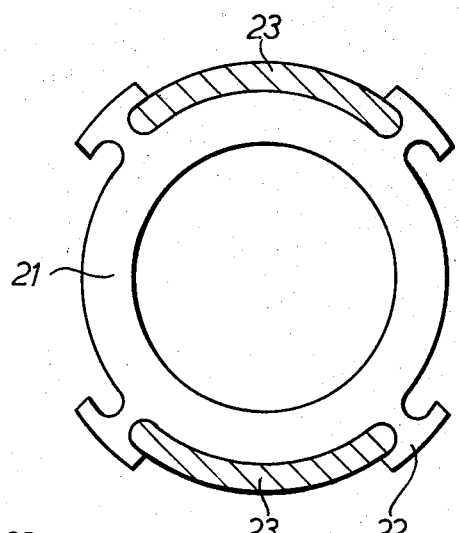
FIG. 9 shows a heat-recoverable article according to the present invention incorporating the tubular coupling shown in FIG. 8.

FIG. 8 shows a tubular coupling 21 provided with four external flanged projections 22. Such a coupling may be deformed by mandrel expansion and then held in a resiliently and thermally strained state by positioning suitable disburdenable keepers 23 between adjacent flanges 22, as shown in FIG. 9. Only two keepers 23 are shown but it will be appreciated that up to four may be employed.

Figure 10:
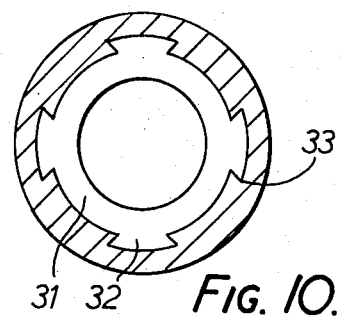
FIG. 10 shows a second form of heat-recoverable article according to the present invention incorporating the tubular coupling shown in FIG. 8.

FIG. 10 shows a similar tubular coupling 31 provided with four external flanged projections 32 and held in a resiliently and thermally strained state by a single disburdenable keeper 33, which is positioned about the coupling 31 by sliding it in a longitudinal direction.

Figure 11:
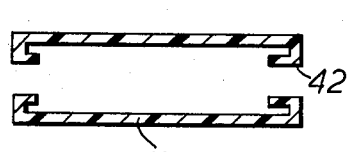
FIG. 11 illustrates a further form of memory metal tubular coupling for use in the present invention.
Figure 12:
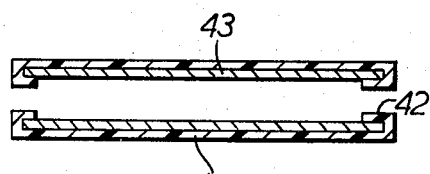
FIG. 12 shows a heat-recoverable article according to the present invention incorporation the tubular coupling of FIG. 11.

FIG. 11 shows a tubular device 41 provided at its end with internal flanged projections 42. As shown in FIG. 12 the device can be longitudinally stretched to a configuration of lesser external diameter and held in a resiliently strained state by the provision of one or more disburdenable keepers 43 between the flanged projections 42. When recovered, the device 41 will contract longitudinally and thereby increase its external diameter and may, for example, be used to effect an internal seal for a hydraulic pipe, or as an actuator.

The articles shown in FIGS. 8 to 12 employ heat-recoverable members of continuous cross-section and thus may be used to form connections, for example, to or between pipes, in which a seal must be maintained. It will be appreciated, however, that they could equally well be made of discontinuous, e.g. split, cross-section.

It will, of course, be appreciated that the keeper may be such that it both weakens and changes shape on heating and/or chemical treatment. It will also be appreciated that two or more keepers may be employed.

Other variations and modifications falling within the scope of the present invention will be apparent to those skilled in the art, for example in certain instances the keeper may be one that can be mechanically weakened or deformed to allow recovery.

Reference is made to coassigned patent application Ser. No. 870,185, filed today by M. D. Gazeley, claiming priority from coassigned British patent application No. 8408/77 filed Feb. 28, 1977, which describes and claims recoverable connectors in which the keeper and/or the recoverable component are profiled to retain the keeper in position in a discontinuity in the recoverable component.

Reference is also made to coassigned patent application Ser. No. 870,183, filed today, by R. J. T. Clabburn and R. J. Penneck, claiming priority from coassigned British patent application No. 2832/77. filed Jan. 24, 1977 which describes and claims recoverable connectors in which the recoverable member is a resilient member.

Finally, reference is made to coassigned patent application Ser. No. 870,195, filed today, by R. J. T. Clabburn claiming priority from coassigned British patent application No. 2834/77 filed Jan. 24, 1977 which describes and claims methods of temporarily raising the transition temperature of memory metals by the use of applied stress provided, for example, by a keeper. The advantages obtained by that invention can be utilised in the connectors of the present invention.

I claim:

1. A method of making a tubular heat-recoverable article comprising the steps of
   applying thermally recoverable strain and resiliently recoverable elastic strain to a tubular memory metal member, wherein the elastic strain is imparted after the thermally recoverable strain has been imparted; and
   maintaining such resiliently recoverable elastic strain by a disburdenable keeper made from a material different from the memory metal and which can be disburdened by selected treatment.

2. A method of making a tubular heat-recoverable article comprising the steps of
   applying thermally recoverable strain and resiliently recoverable elastic strain to a tubular memory metal member, wherein the elastic strain is imparted at the same time as the thermally recoverable strain is imparted; and
   maintaining such resiliently recoverable elastic strain by a disburdenable keeper made from a material different from the memory metal and which can be disburdened by selected treatment.

3. A method of making a connection comprising the steps of (a) selecting a connector comprising a tubular heat-recoverable memory metal member held in a resiliently recoverable elastically strained state by a keeper that can be disburdened, (b) disburdening of the keeper to allow resilient recovery; and (c) subsequently heating the memory metal member to effect connection.

4. A method as claimed in claim 3, wherein the connection formed is insulated by a heat-recoverable polymeric sleeve.

5. A method as claimed in claim 3, wherein the memory metal member is disburdened of the keeper by chemical treatment to allow resilient recovery before it is heated to effect thermal recovery.

6. A method as claimed in claim 3, wherein the connection is made to the sheath of a mineral insulated cable to form an earth connection.

7. A method as claimed in claim 3 wherein the memory metal member is hollow, has a discontinuity in its wall, and the keeper is in the discontinuity.

8. A method of making a connection to at least one substrate comprising the steps of (a) positioning the substrate within a dimensionally recoverable article comprising a heat-recoverable tubular memory metal member held in a resiliently recoverable elastically strained state by a keeper, the keeper being made from a material which is different from the memory metal and which upon chemical treatment and heat treatment can allow both thermal and resilient recovery of the memory metal member, and (b) selectively treating said keeper by chemical treatment and heat treatment to cause it to allow the memory metal member to thermally and resiliently recover and grip the substrate.

9. A tubular heat recoverable article which comprises a heat-recoverable tubular memory metal member held in a resiliently recoverable elastically strained state by a keeper, wherein the memory metal member has flanged projections on the surface opposite the direction of recovery and the keeper is positioned between adjacent flanges, the keeper being made from a material which is different from the memory metal and which upon selected treatment can allow both thermal and resilient recovery of the memory metal member.

10. The article of claim 9 wherein the memory metal member is of continuous cross section.

11. A tubular heat-recoverable article which comprises a heat-recoverable tubular memory metal member held in a resiliently recoverable elastically strained state by a keeper, wherein the memory metal member has grooves on the surface opposite the direction of recovery and the keeper is positioned to cooperate with the grooves, the keeper being made from a material which is different from the memory metal and which upon selected treatment can allow both thermal and resilient recovery of the memory metal member.

12. The article of claim 11 wherein the memory metal member is of continuous cross section.

13. A method of making a connection comprising the steps of (a) selecting a connector comprising a tubular heat-recoverable memory metal member held in a resiliently recoverable elastically strained state by a keeper that can be disburdened, (b) disburdening the keeper to allow resilient recovery, and (c) simultaneously heating the memory metal member to effect connection.

14. A method as claimed in claim 13, wherein the connection formed is insulated by a heat-recoverable polymeric sleeve.

15. A method as claimed in claim 13, wherein the connection is made to the sheath of a mineral insulated cable to form an earth connection.

* * * * *